(12) United States Patent
Stahl et al.

(10) Patent No.: US 7,659,940 B2
(45) Date of Patent: Feb. 9, 2010

(54) APPARATUS AND METHOD FOR IMPROVED DEVICE INTEROPERABILITY

(75) Inventors: Thomas Anthony Stahl, Indianapolis, IN (US); Benoit Pol Menez, Carmel, IN (US)

(73) Assignee: Thomson Licensing, Boulogne Billancourt (FR)

(*) Notice: Subject to any disclaimer, the term of this patent is extended or adjusted under 35 U.S.C. 154(b) by 1752 days.

(21) Appl. No.: 10/275,199

(22) PCT Filed: May 11, 2001

(86) PCT No.: PCT/US01/15341

§ 371 (c)(1), (2), (4) Date: Nov. 1, 2002

(87) PCT Pub. No.: WO01/89224

PCT Pub. Date: Nov. 22, 2001

(65) Prior Publication Data

US 2003/0227568 A1 Dec. 11, 2003

Related U.S. Application Data

(60) Provisional application No. 60/204,054, filed on May 12, 2000.

(51) Int. Cl.
*H04N 11/00* (2006.01)
(52) U.S. Cl. .................. 348/552; 348/734; 348/569
(58) Field of Classification Search ............. 348/569, 348/552, 734; H04N 11/00
See application file for complete search history.

(56) References Cited

U.S. PATENT DOCUMENTS

| 5,969,750 | A | | 10/1999 | Hsieh et al. .................. 348/15 |
| 5,995,106 | A | * | 11/1999 | Naughton et al. ........... 715/854 |
| 6,046,985 | A | | 4/2000 | Aldred et al. ................ 370/252 |
| 6,693,638 | B1 | * | 2/2004 | An et al. ..................... 345/503 |
| 6,781,518 | B1 | * | 8/2004 | Hayes et al. ........... 340/825.72 |
| 6,879,348 | B1 | * | 4/2005 | Niida ......................... 348/552 |

FOREIGN PATENT DOCUMENTS

| EP | 838768 | 4/1998 |
| EP | 995774 | 11/1999 |
| EP | 996069 | 4/2000 |
| FR | 2779596 | 12/1999 |
| WO | 97/49057 | 12/1997 |

OTHER PUBLICATIONS

"The Havi Architecture, Version 0.8" HavI Architecture, No. 8, May 15, 1998, pp. 6-18.

* cited by examiner

*Primary Examiner*—Trang U Tran
(74) *Attorney, Agent, or Firm*—Robert D. Shedd; Paul P. Kiel (57) ABSTRACT

An apparatus and method for controlling a plurality of electronic devices, such as consumer electronic devices, or the like, via a digital bus. In particular, the present invention provides for improved interoperability of such devices over the digital bus. In one embodiment, the present invention transfers identifying information from a peripheral device to a display device during a discovery mode for providing a device selection screen having a plurality of device icons displayed thereon. The device icons are generated by the display, or controlling device, in response to identifying information, such as keywords stored in a configuration ROM of the peripheral device.

22 Claims, 9 Drawing Sheets

| EIA INFO BLOCK | |
|---|---|
| ADDRESS OFFSET | CONTENTS |
| $0000_{16}$ | total_length |
| $0001_{16}$ | |
| $0002_{16}$ | Info_block_type (= $00_{16}$ vendor_specific) |
| $0003_{16}$ | |
| $0004_{16}$ | fields_length |
| $0005_{16}$ | |
| $0006_{16}$ | Specifier_ID (=EIA) |
| $0007_{16}$ | |
| $0008_{16}$ | |
| $0009_{16}$ | EIA_info_block_typeCode |
| $000A_{16}$ | |
| $000B_{16}$ | EIA block type-specific data |
| ... | |
| ... | |

FIG. 5

| \multicolumn{2}{c}{EIA-775 PLUG INFO} | |
|---|---|---|
| ADDRESS OFFSET | CONTENTS | |
| 00 00$_{16}$ | EIA_775_info_block version | 61 |
| 00 01$_{16}$ | OSD_input_plug_ID | 62 |
| 00 02$_{16}$ | OSD_output_plug_ID | 63 |
| 00 03$_{16}$ | analog_video_input_plug_ID | 64 |
| 00 04$_{16}$ | analog_video_output_plug_ID | 65 |
| 00 05$_{16}$ | digital_transport_stream_input_plug_ID | 66 |
| 00 06$_{16}$ | digital_transport_stream_output_plug_ID | 67 |
| 00 07$_{16}$ 00 08$_{16}$ 00 09$_{16}$ 00 0A$_{16}$ | transport_stream_input_format | 68 |
| 00 0B$_{16}$ 00 0C$_{16}$ 00 0D$_{16}$ 00 0E$_{16}$ | transport_stream_output_format | 69 |
| 00 0F$_{16}$ ••• ••• 00 1E$_{16}$ | Reserved for future definition | 70 |

APPARATUS AND METHOD FOR IMPROVED DEVICE INTEROPERABILITY

This application claims the benefit under 35 U.S.C. § 365 of International Application PCT/US01/15341, filed May 11, 2001, which was published in accordance with PCT Article 21(2) on Nov. 22, 2001 in English; and which claims benefit of U.S. provisional application Ser. No. 60/204,054 filed May 12, 2000.

FIELD OF THE INVENTION

The invention involves a system for controlling multiple electronic devices, such as consumer electronic devices or the like, via interconnections such as digital data buses. More particularly, this invention concerns an arrangement for managing the interoperability of such devices.

BACKGROUND OF THE INVENTION

A data bus can be utilized for interconnecting electronic devices such as television receivers, display devices, videocassette recorders (VCR), direct broadcast satellite (DBS) receivers, and home control devices (e.g., a security system or a temperature control device). Communication using a data bus occurs in accordance with a bus protocol. Examples of bus protocols include the Consumer Electronics Bus (CEBus) and the IEEE 1394 High Performance Serial Bus.

A bus protocol typically provides for communicating both control information and data. For example, CEBus control information is communicated on a "control channel" having a protocol defined in Electronics Industries Association (EIA) specification IS-60. On an IEEE 1394 serial bus, control information is generally passed using the asynchronous services of the serial bus. Control information for a particular application can be defined using for example, Common Application Language (CAL) or AV/C.

Today, most A/V devices are controlled with a remote control (RC) unit. The protocol between the peripheral device and the RC unit is device specific such that each device comes with its own RC unit. Each such peripheral device interprets the key presses it receives via its direct link and carries out the corresponding actions.

Figure 1:
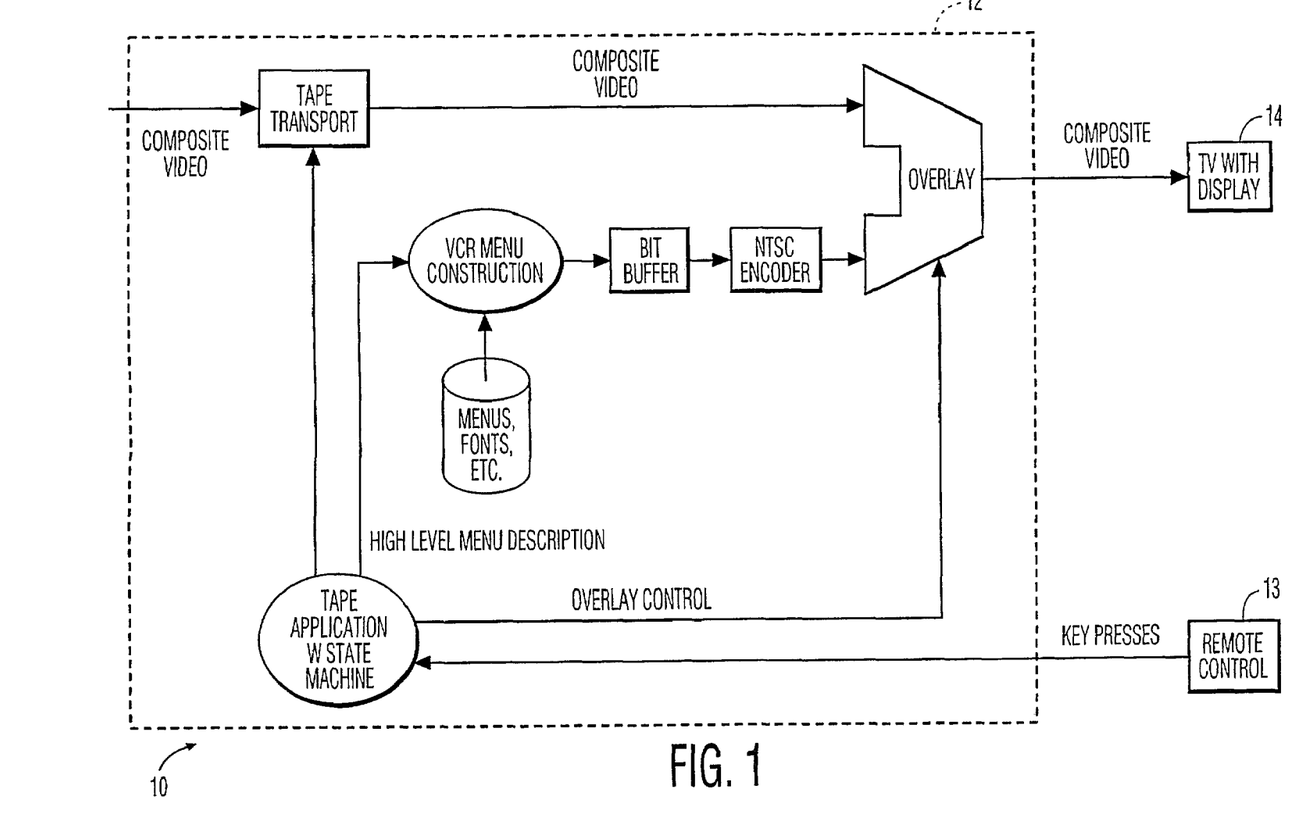
FIG. 1 shows, in simplified block-diagram form, the interoperability of a prior art audio/video system.

In today's analog audio/video (A/V) cluster, controlling peripheral devices may include, but do not require, the activation of an On-Screen Display (OSD) mechanism on a display device (i.e., TV). The OSD of such A/V devices is generated in the peripheral or target device (e.g., digital VCR) and is output on the NTSC output of such devices the same way as any other video signal. Thus, no additional hardware or software is needed in either the peripheral or the display device. FIG. 1 illustrates an A/N system 10 having a VCR 12 and a display device 14 (e.g., television) that employs such a control methodology. Menus associated with controlling VCR 12 are generated by the VCR 12 and are provided to the display device 14 via the NTSC output of the VCR 12 as a composite video.

Figure 2:
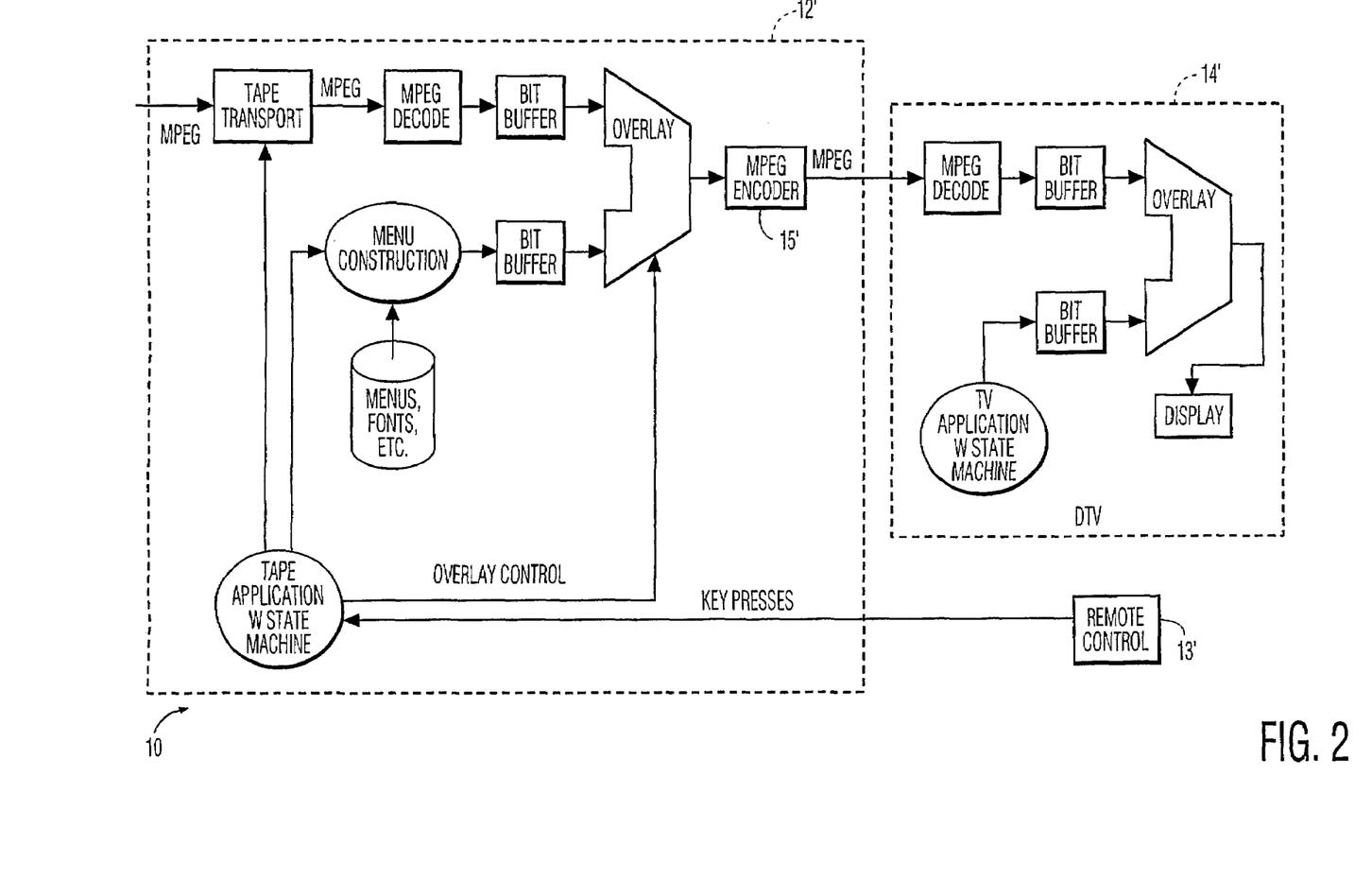
FIG. 2 shows, in simplified block-diagram form, the extension of the prior art interoperability between a digital VCR and a digital television.

Unfortunately, to use the same approach (See FIG. 2) with a digital TV (DTV) as a display device 12' is not practical since it would require the menus to be transported as MPEG-2 transport streams. Generation of such streams necessitates integrating an MPEG encoder 15' into all peripheral devices which greatly increases the cost and complexity of such consumer electronic devices. Additionally, the GUI associated with the controlling device and peripheral device may differ and require the user to employ multiple remote control devices resulting in inconvenience for the user. Additionally, it is desired to improve the discovery process to provide on screen displays that facilitate user control of a system comprising multiple electronic devices.

SUMMARY OF THE INVENTION

The present invention provides for improved interoperability for exchanging audio/video (A/V) content and associated control between common consumer electronic (CE) devices. The interface is based on IEEE 1394 serial bus for the physical and link layers and makes use of a suitable control language such as AV/C or CAL for managing OSDs and controlling connectivity of devices interconnected via a digital serial bus.

In one embodiment, the present invention provides for a digital television apparatus, comprising: a processor; memory, coupled to the processor, having data associated with a plurality of device icons stored therein; means for communicating with a peripheral device interconnected by a digital bus, the peripheral device including a memory having identification data stored therein; the communicating means transferring the identifying data to the processor during a set up mode, the processor correlating the identification data with a particular one of the plurality of device icons and generating display data associated with a device selection screen having the correlated device icon thereon.

In another embodiment, the present invention is a digital television apparatus, comprising: a processor; means, coupled to the processor, for communicating with a peripheral device interconnected by a digital bus, the peripheral device including a memory having identification data stored therein; the communicating means transferring the identification data to the processor, including data specifying a required bit rate for transferring program data from the peripheral device to the digital television apparatus, the processor establishing an isochronous channel on the digital bus having a bandwidth determined in response to the identification data.

In another embodiment, the present invention provides a digital television apparatus, comprising: a display; a processor, coupled to the display, for generating OSD signals in accordance with a first user interface mode in response to user commands transmitted from a remote control unit associated with the digital television apparatus; means, coupled to the processor, for communicating with a peripheral device interconnected by a digital bus, the peripheral device generating OSD signals in accordance with a second user interface mode in response to user commands transmitted from a second remote control unit associated with the peripheral device; the processor generating OSD signals for providing a user interface mode selection display in response to a predetermined user command, the user interface mode selection allowing the user to select one of the first user interface mode and the second user interface mode as a default user interface mode, the processor generating OSD signals in accordance with one of the first user interface mode and the second user interface mode in response to user selection of a default mode.

BRIEF DESCRIPTION OF THE DRAWINGS

The invention may be better understood by referring to the drawings, wherein.

In the drawings, reference numerals that are identical in different figures indicate features that are the same or similar.

DETAILED DESCRIPTION

The use of IEEE 1394 serial bus has been suggested for many applications within a Home Network environment. It is being built into the next generation PCs and will be used for many local peripherals including disc drives. Further, digital audio/video consumer electronic devices such as digital televisions (DTVs) and digital videocassette recorders (DVHS) may utilize a serial bus for interconnecting these devices.

Figure 3:
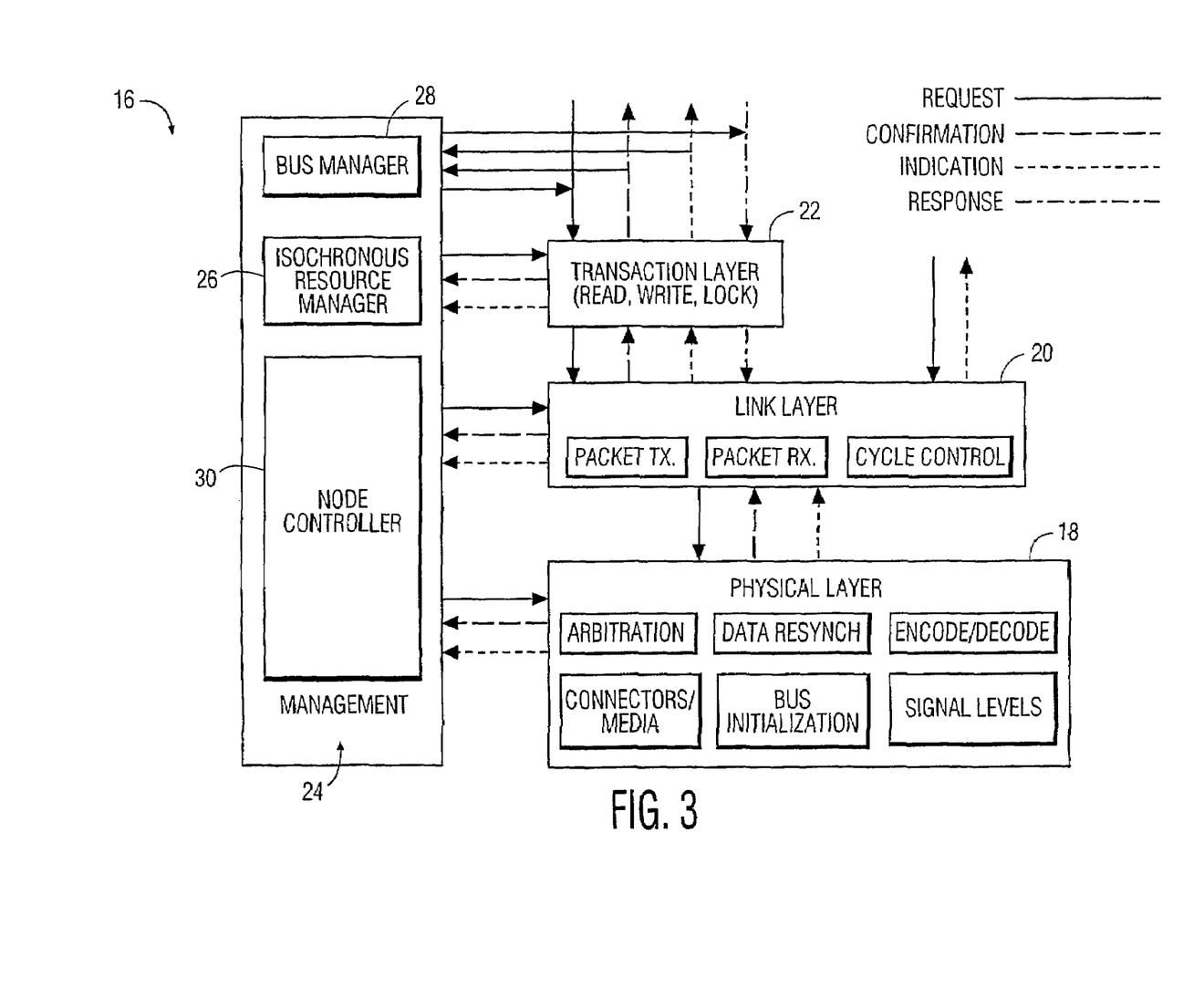
FIG. 3 is a simplified schematic block diagram illustrating the IEEE 1394 serial bus protocol.

IEEE-1394 is a high speed, low cost digital serial bus developed for use as a peripheral or back-plane bus. Some of the highlights of the bus include: dynamic node address assignments, data rates of 100, 200, and 400 Mbits/sec, asynchronous and isochronous modes, fair bus arbitration, and consistency with ISO/IEC 13213. FIG. 3 illustrates the serial bus protocol for the IEEE 1394 serial bus 16 as a set of three stacked layers.

The physical layer 18 consists of the physical signaling circuits and logic that are responsible for power-up initialization, arbitration, bus-reset sensing, and data signaling. Two shielded low-voltage differential signal pairs, plus a power pair are defined for the IEEE-1394 serial cable. Signaling is done using data-strobe bit level encoding which doubles jitter tolerance.

Data is formatted into packets in the link layer 20. Two classes of data communication between devices are supported: asynchronous and isochronous. Asynchronous communication can be characterized as "allows acknowledgment," while isochronous communication can be characterized as "always on time." The asynchronous service will be used primarily for control and status messages while isochronous communication will be used for data streams such as MPEG video. The timely nature of isochronous communication is achieved by providing a cycle every 125 μsec. Isochronous cycles take priority over asynchronous communication.

Asynchronous transfer can take place any time the bus is free. A minimum of 25 μsec out of every 125 μsec cycle is reserved for asynchronous data transfer. Isochronous transfer provides a real-time data transfer mechanism. An ongoing isochronous communication between one or more devices is referred to as a channel. The channel has to be established first, then the requesting device is guaranteed to have the requested amount of bus time every cycle.

The transaction layer 22 defines a complete request-reply protocol to perform bus transactions. Although transaction layer 22 does not add any services for isochronous data transfer, it does provide a path for management of the resources needed for isochronous services. This is done through reads and writes to the control status registry (CSR). Transaction layer 22 also defines a retry mechanism to handle situations where resources are busy and unable to respond. Asynchronous data is transferred between IEEE-1394 nodes utilizing one of three transactions; "read-data" for retrieving data from a different node, "write-data" for transferring data to a different node and "lock-data" for transferring data to a different node for processing and then the data is returned back to the original node.

Serial bus management 24 describes the protocols, services, and operating procedures whereby one node is selected and may then exercise management level control over the operation of the remaining nodes on the bus. There are two management entities defined for IEEE-1394 serial bus; the isochronous resource manager 26 and the bus manager 28. These two entities may reside on two different nodes or on the same node. A separate bus manager 28 may be absent from the bus. In this circumstance, the isochronous resource manager 26 exercises a subset of the management responsibilities normally assumed by the bus manager 28. The bus manager 28 provides a number of services including; maintenance of the speed and topological map, and bus optimization. The isochronous resource manager 26 provides facilities for allocation of isochronous bandwidth, allocation of channel numbers, and the selection of the cycle master.

Node control is required at all nodes; node controller 30 implements the CSRs required by all serial bus nodes and communicates with the physical 18, link 20, and transaction 22 layers and any application present in the device. Node controller 30 component as well as CSR and configuration ROM facilities are used to configure and manage the activities at an individual node.

For the IEEE 1394 serial bus to function properly, an isochronous resource manager (IRM) and a bus manager (BM) will be needed. Since most clusters (i.e., devices interconnected via a digital bus) will include a display device of some kind, it should be required that a Set Top Box with Analog Display and DTV must be IRM and BM capable. In some cases, such as an all audio cluster, a display device may not be present. In this case, it should also be required that a Digital Audio Amp be IRM and BM capable.

IRM 26 provides the resources necessary for the serial bus to cooperatively allocate and de-allocate the isochronous resources, (channels and bandwidth), required for orderly isochronous operations IRM 26 provides a common location for the other nodes to check on availability of channels and bandwidth, and to register their new allocations. IRM 26, whose location is known immediately upon completion of the self identify process, also provides a common location where serial bus nodes may determine the identity of BM 28, if one is present.

BM 28, if present, provides management services to other nodes on the serial bus. These include activation of a cycle master, performance optimization, power management, speed management and topology management.

There are a number of management procedures for each connection type that allows an application to establish a connection, overlay a connection, and break a connection. These procedures involve allocation of IEEE-1394 resources, setting appropriate values into the plug control registers, reporting possible failure conditions to the application, and managing connections after a bus reset. One such CMP follows.

To transport isochronous data between two A/V devices on a IEEE 1394 serial bus, it is necessary to connect an output plug on the transmitting device to an input plug on the receiving device using one isochronous channel. The relationship between one input plug, one output plug and one isochronous channel is called a point-to-point connection. Similarly there are broadcast-out connections (one output plug and one isochronous channel) and broadcast-in connections (one input plug and one isochronous channel).

The flow of isochronous data is controlled by one output plug control register (oPCR) and one output master plug register (oMPR) located on the transmitting side. oMPR controls all the attributes (e.g. data rate capability, broadcast channel base etc.) that are common to all isochronous flows transmitted by the corresponding A/V device.

The reception of an isochronous data flow through an input plug is controlled by one input plug control register (iPCR) and one input master plug register (iMPR) located in the receiving device. iMPR controls all the attributes (e.g. data rate capability etc.) that are common to all isochronous data flows received by the corresponding device.

The major steps involved in establishing a connection are allocation of IEEE 1394 resources (e.g. bandwidth) and setting channel, data-rate, overhead-ID and connection counter in oPCR and iPCR.

An isochronous data flow can be controlled by any device connected to the IEEE 1394 serial bus by modifying the corresponding plug control registers. Although Plug control registers can be modified by asynchronous transactions on IEEE 1394 serial bus, the preferred method of connection management is through the use of AV/C. It is fully within the scope of this invention to employ CAL for connection management.

In order for a consumer electronic device to interact with other devices interconnected via a IEEE 1394 serial bus, a common product mode and common set of commands must be defined. Three standard approaches for device modeling and control are CAL, AV/C and the approach adopted for the Universal Serial Bus (USB).

CAL and AV/C are control languages that distinguish between logical and physical entities. For example, a television (i.e., a physical entity) may have a number of functional components (i.e., logical entities) such as a tuner, audio amplifier, etc. Such control languages provide two main functions: Resource allocation and Control. Resource allocation is concerned with requesting, using and releasing Generic Network resources. Messages and control are transported by the FCP as defined in IEC-61883 and discussed above. For example, CAL has adopted an object base methodology for its command syntax. An object contains and has sole access to a set number of internal values known as instance variables (IV). Each object keeps an internal list of methods. A method is an action that an object takes as a result of receiving a message. When a method is invoked, one or more IVs are usually updated. A message consists of a method identifier followed by zero or more parameters. When an object receives a method, it looks through its list of methods for one which matches the method identified in the message. If found, the method will be executed. The parameters supplied with the message determine the exact execution of the method.

The primary means of user-machine input for analog audio/video devices (A/V) today is the use of a remote control (RC) unit or the front panel. Some of the interaction may also make use of an on-screen display (OSD) mechanism. In this kind of interaction, the user interacts directly with the peripheral. In the case of today's remote controls, the messaging protocol used is device and/or manufacturer specific. The peripheral device processes the received commands and carries out the required actions. If an OSD is used, this includes keeping track of the RC keys processed and updating the displayed OSD accordingly after each keypress.

Figure 4:
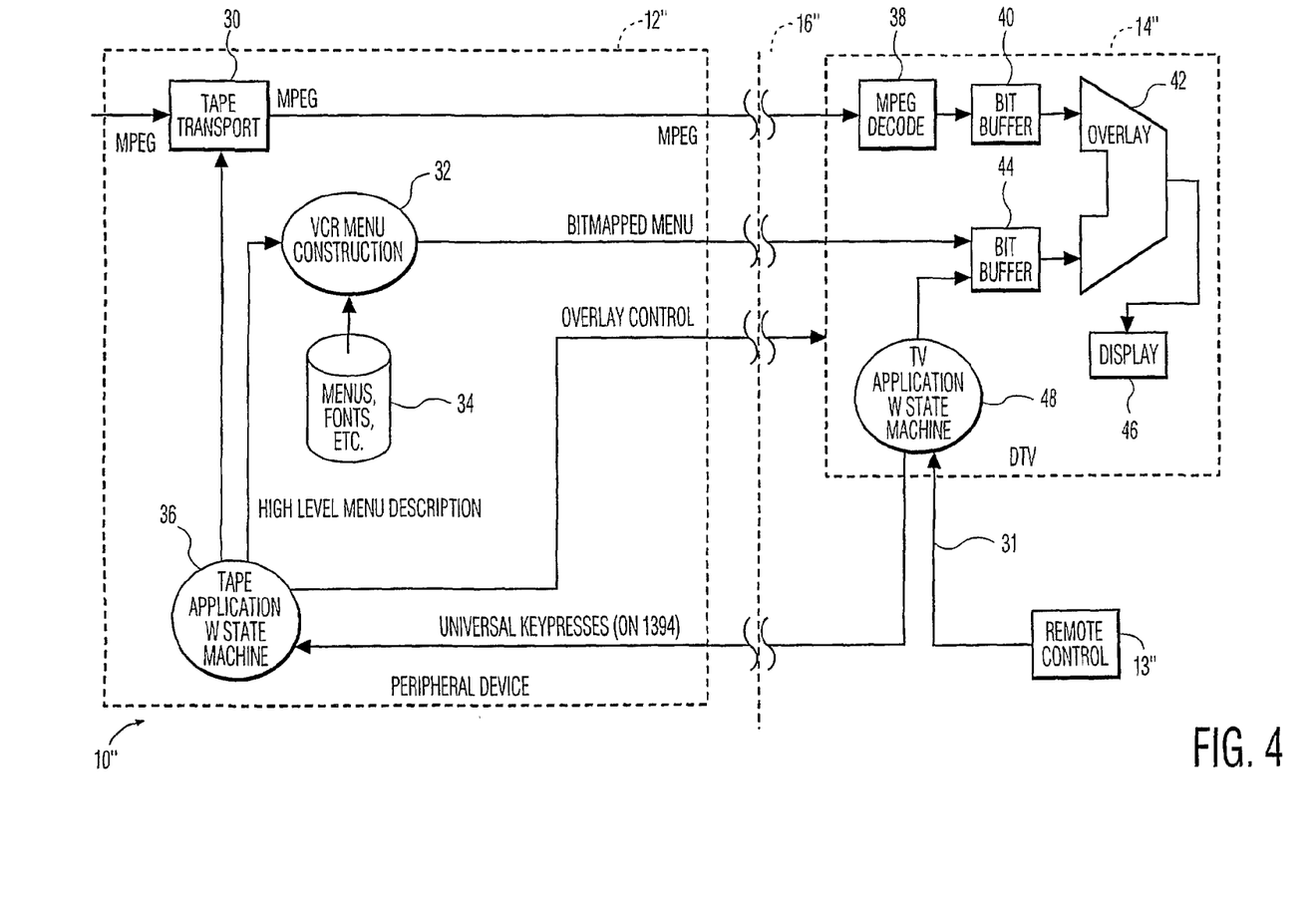
FIG. 4 shows, in simplified schematic block-diagram form, the interoperability of digital devices employing the present invention.

FIG. 4 illustrates an A/V cluster interconnected by an IEEE 1394, and suitable for interoperability in accordance with the present invention. Although FIG. 4 illustrates DTV 14" interconnected with DVCR 12" it is to be understood that the principles of the present invention are applicable the interconnection between any suitable control and display device and peripheral devices, including, but not limited to, DVD player, PVR, DBS receiver, and cable STB.

In FIG. 4, program data is transferred to DTV 14" via bus 16" as MPEG-TS data. The bitmapped menu associated with OSDs that are generated in response to user commands transmitted from remote control 13" or status information generated by device 12" are separately transmitted via digital bus 16". The overlay control information including the various control commands are also transmitted via digital bus 16". The decoded program information and the menu information is combined by overlay 42 and displayed on display unit 46. By transferring the program information as MPEG-TS data to MPEG decoder 38 and the bitmapped menu information to bit buffer 44, the present arrangement obviates the need for an additional MPEG decoder and encoder to be included in peripheral device 12". As described below, various control and status information may also be easily transferred between DTV 14" and peripheral device 12" via the digital bus.

Discovery Process

The interoperability according to the present invention includes a discovery process. The discovery process allows the controlling device to discover other devices in the network. This process is activated by a bus reset and serves to search and discover existing devices on the network. A bus reset may be caused by connecting/disconnecting a device, software initiated reset etc. This software module relies on some information stored on each device configuration ROM. This information is referred to as Self Description Device Table (SDDT) and contains information such as Model #, Location of menu, URL, EUI Vendor ID etc.

The SDDT of the controlling or display device contains a pointer to an information block which contains information about the display capabilities of the device. The information block may include type of display (interlaced or progressive), maximum bytes per line, resolution modes supported (full, ½, ⅓), mix weights supported, maximum bits/pixel supported for palette mode (2, 4, 8) and maximum block size supported other methods of discovery can also be used to obtain this information such as, the Home Plug and Play defined for CAL or the subunit descriptors defined for AV/C.

After the bus initialization is complete, the discovery manager of the controlling device reads the SDDT located in the ROM of each connected device. This information is built into a registry table. Each device on the IEEE 1394 serial bus will have a registry table which will be used to keep track of other devices on the bus and their capabilities. For all devices on the bus, this registry table (or registry) will be updated during the discovery process. The registry provides services to the application for mapping volatile characteristics(e.g., 1394 node_ID, IP address etc.) a non-volatile 64-bit EUI (Extended Unique Identifier) for identifying any node on 1394 bus.

The registry table is maintained by the registry manager within each device and contains the information for each node to provide the service previously specified. This registry table is constantly updated by the discovery manager on bus resets. An example of the construction of such a registry Table follows:

| 64-bit EUI | 1394 node_ID | IP address | Manufac/Model # | Device Type |
| --- | --- | --- | --- | --- |

The fields of the registry table are defined as:

64-bit EUI is a 64-bit number that uniquely identifies a node among all the Serial Bus nodes manufactured world-wide.

1394 node_ID is a 16-bit number that uniquely identifies a Serial bus node within a IEEE 1394 SERIAL BUS subnet. The most significant 10 bits are the bus ID and the least significant bits are the physical ID. Bus ID uniquely identifies a particular bus within a group of bridged buses. Physical ID is dynamically assigned during the self-identification process.

IP address is a 32-bit private IP address assigned dynamically.

Manufacturer/Model # is obtained from the device's SDDT and is used to inform the customer of possibilities for selecting a source.

Device Type is also obtained from the device's SDDT and is used to inform the customer of possibilities for selecting a source. This field may also be useful in determining what stream format should be used. For example, a game machine may not use MPEG 2 as an output format.

The registry can be used to determine the IEEE 1394 serial bus address for any node on the home network based on the 64-bit EUI of that node. Correlation to a stable identifier such as the EUI is important since node addresses can change during a bus reset.

On each of the CE devices, some setup occurs at installation time (through the use of the Device Setup Manager) as described above for mapping other devices on the cluster to output or input channels of that devices. This does not necessarily mean that IEEE 1394 isochronous channels are allocated at this time. Another possibility is that each device merely loads a selection menu with devices found on the network by looking at the SDDT. Interaction can start by first addressing the display device (assumed to be digital in this example) and selecting the device that the user desires to control (e.g., digital VCR). When this happens, an isochronous channel is set up between the DVHS and the display device.

As noted, the configuration ROM and AV/C Info Blocks may be used to discover the capabilities of other devices on the bus. One element of the configuration ROM specified in many standards, for example, EIA 775A, is a Model Name Descriptor field. Such a descriptor typically contains ASCII text with little to no further guidance on what else should be placed there. Some of that is by design because it may not be necessary to be able to discover the type of source device. This descriptor generally is meant to include a generic text description that provides basic support to any device that can display video and/or an OSD. The intention of the descriptor is to allow the destination device, for example a DTV, to use the text description to build a source selection screen. The DTV can also discover output plugs, so it is possible for the DTV to determine all possible source devices and provide a selection screen to the user. The model names contained in the descriptor would be used in building a simple text based source selection screen.

However, it has been suggested that a text based source selection screen is very low feature for such high technology. Rather, it would be desirable to also be able to display pictures or icons of the various devices in this screen. One way to solve this would be to provide a way to discover simple icons (bitmapped or otherwise) from each device. Alternatively, a different approach that does not require normative changes to a specific standard is to standardize a set of keywords used in the Model Name Descriptor field. These keywords could be used within the Model Name ASCII string to designate the type of device. For example, a DVD player would include the keyword "DVD." A DVCR may include the keyword "DVCR." The controlling device would search the ASCII string for these keywords and correlate them to a set of embedded icons. For example, a DTV could store an icon for a generic DVD player or DVCR. When the DTV displays the source selection screen to the user, the DTV would add the designated icon to those devices that the DTV recognizes. The DTV could use a generic icon for those devices that the DTV does not recognize.

More specifically with respect to EIA-775A, there are two levels of discovery. To discover the highest level of information regarding interoperability, a controlling device reads the IEEE1212 Configuration ROM in all devices on the IEEE 1394 network immediately after a bus reset. From this, the controlling device will learn what other devices support AV/C and/or EIA-775A. The highest level of the IEEE1212 ROM is the Bus Info Block and the Root Directory. Everything else can be accessed using pointers off of this directory and sub-directories. A pointer directly to the "Vendor directory" is included in the Root Directory. Since IEEE1394 logically looks like a microprocessor bus (i.e., memory locations), the directories are read from across the bus into local memory using an Asynchronous Read Command. The Vendor Directory is shown in Table 1. Note that the Vendor Directory includes "Model_name_textual_descriptor offset." This offset points to a textual descriptor that includes the vendor's choice for the name of the product. Currently, under EIA-775A, the only restriction on this descriptor is that it consists of minimal ASCII characters.

TABLE 1

Vendor directory

Vendor_directory

| | directory length | CRC |
| --- | --- | --- |
| $17_{16}$ | | Model_ID |
| $81_{16}$ | | Model_name_textual_descriptor offset |
| .... | | <<possibly other fields>> |
| .... | | .... |

Figure 8:
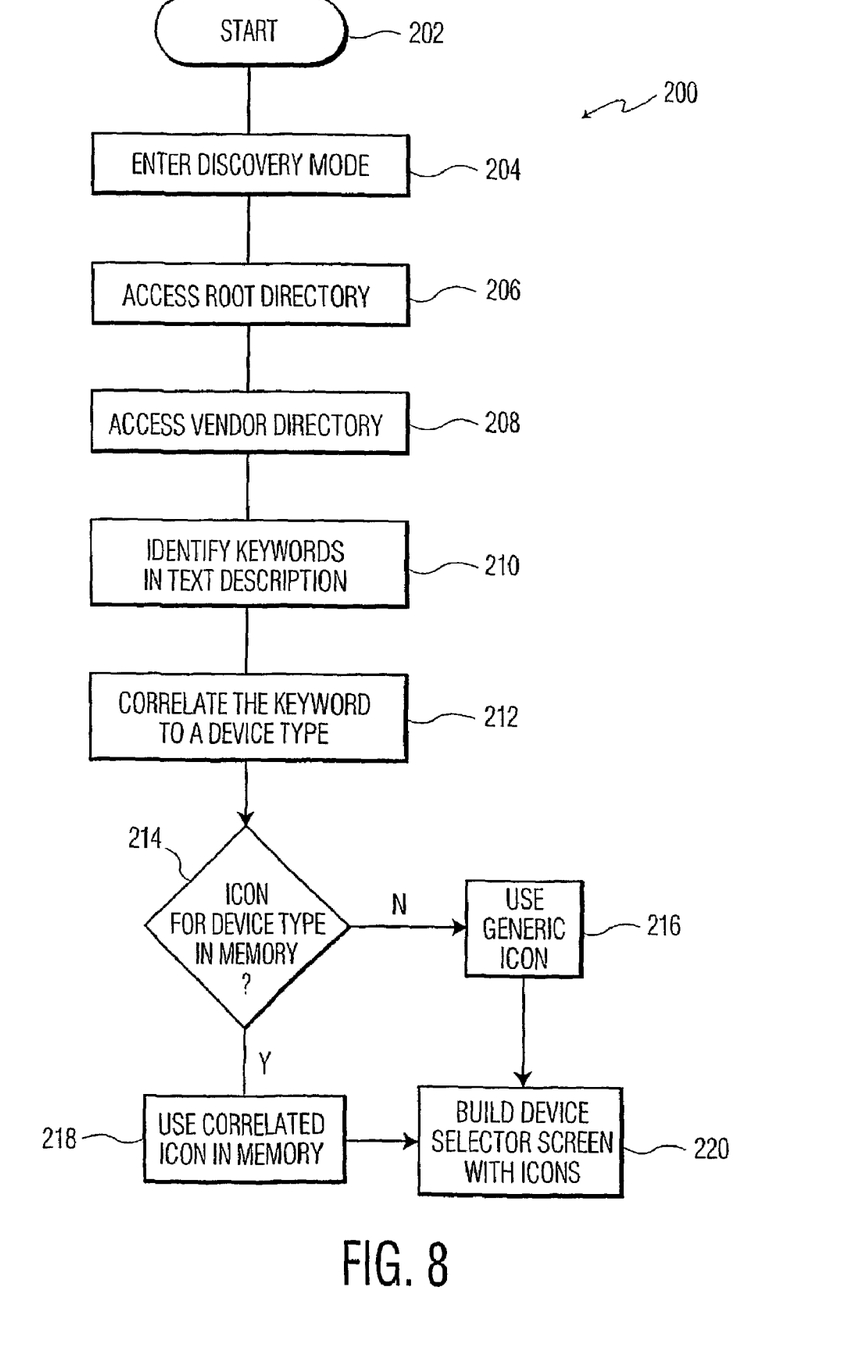
FIG. 8 shows the steps for generating a device selector screen in accordance with the present invention.

These model names can be gathered by the controlling, or display, device and then used to build a source selection screen. Unfortunately, a reliable source selection screen would only be able to include this text to identify the source since the standardization of graphical icons is not included in EIA-775A. However, additional constraints can be placed upon the textual descriptor requiring the inclusion of a keyword associated with the type of product (e.g., VCR, DVD, etc.). The display device could detect the keyword in the text string, associated with the keyword with an icon stored in memory, and display the associated icon, along with the text description, on the source selection screen. A user may select the desired source device by, for example, placing a highlight over the icon and pressing a SELECT key. If the display device does not recognize the text description, the display device would provide a generic icon. It should be noted that a particular standard, such as the EIA-775A or EIA-799, would not need to be modified to implement this feature. The use of keywords could be instead be listed as a recommended practice. The steps for generating a source selector screen according to the above is illustrated in FIG. 8.

Also, a particular standard may provide a mechanism for a source device to supply an icon in the general configuration ROM. In such a case, the display device may be configured to present the icon supplied in the configuration ROM. However, such a method has the disadvantage of complicating the source devices and increasing memory requirments.

When interconnecting various A/V devices via a digital bus, one consideration is the bandwidth required for various isochronous channels set up by the controlling device. In this regard, the user-machine paradigm should be considered, wherein one option is to use a user-machine control paradigm that is similar to that commonly used in A/V entertainment clusters today. For example, in EIA-775A, it is recommended that the destination, or controlling, device (usually a DTV) be the device that sets up isochronous connections. One reason for this is that it is natural for users to choose destination devices from source devices. Most A/V components used in current analog A/V clusters use this connection strategy.

Such arrangements may also require that the isochronous channels shall be set up to accommodate a certain bit rate. This predetermined bit rate is required because there may not be a standardized way of determining the actual BW required and communicating that information to the destination device. For example, EIA-775A specifies 40 Mbps. This number was chosen to cover most situations. For example, ATSC Terrestrial broadcast is a 19.39 Mbps signal. If 16VSB is used, the bit rate is 38.8 Mbps. 64QAM (used by cable) consumes around 25.6 Mbps and 256QAM (also used by cable) consumes around 38.8 Mbps. Although a bit rate of 40 Mbps accommodates all of these rates, it is not very efficient use of bus bandwidth. For example, an S200 bus would only be able to have 4 simultaneous 40 Mbps channels.

If PTS (Partial Transport Streams) were created and if the source device could determine the average and peak bit rates, then the bit rate information could be communicated to the destination device prior to setting up the isochronous channel. Currently, such information can be included in a Partial Transport Stream Descriptor included in the new SIT/DIT structures. However, such information is embedded in the stream and the channel is required to have been set up before the destination device can receive these structures. Therefore, it is desirable to communicate such information to the destination device before the channel is set up.

In accordance with the present invention, such bit rate information is communicated to the destination device prior to setting up the channel, thereby allowing the controlling device to more efficiently set up the channel by allocating only the necessary bandwidth required for that particular source device.

Also, just as it would be useful for the source device to communicate bandwidth needs to the controlling device prior to setting up a channel, it would be useful for the source device to inform the destination device of the type of bit stream that will be sent. In some cases the source device may send a DSS stream, in other cases it may send an MPEG2-TS.

Figure 5:
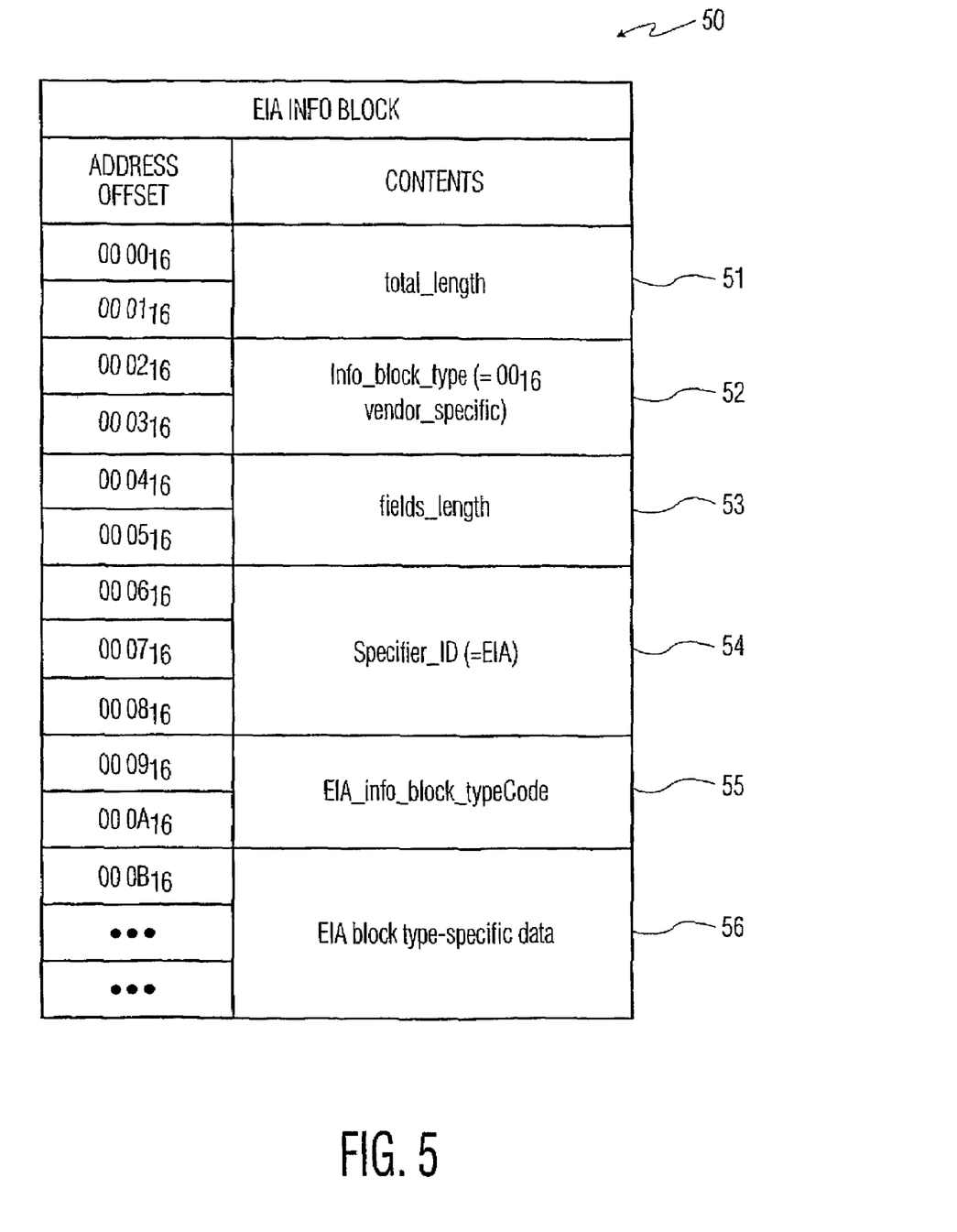
FIG. 5 shows a table illustrating the elements of the EIA unit info block according to the present invention.

One method for implementing such a feature is to use an available information block that the destination device accesses during the discovery process. For example, in the EIA-775, even after modifications to the EIA-775 Plug Info described in FIGS. 5 and 6, two of the reserved bytes are still available in the Info Block. Even if the reserved bytes are used, it is easy to add additional fields using the length fields provided in the Info Block and in the Unit Descriptor.

Figure 9:
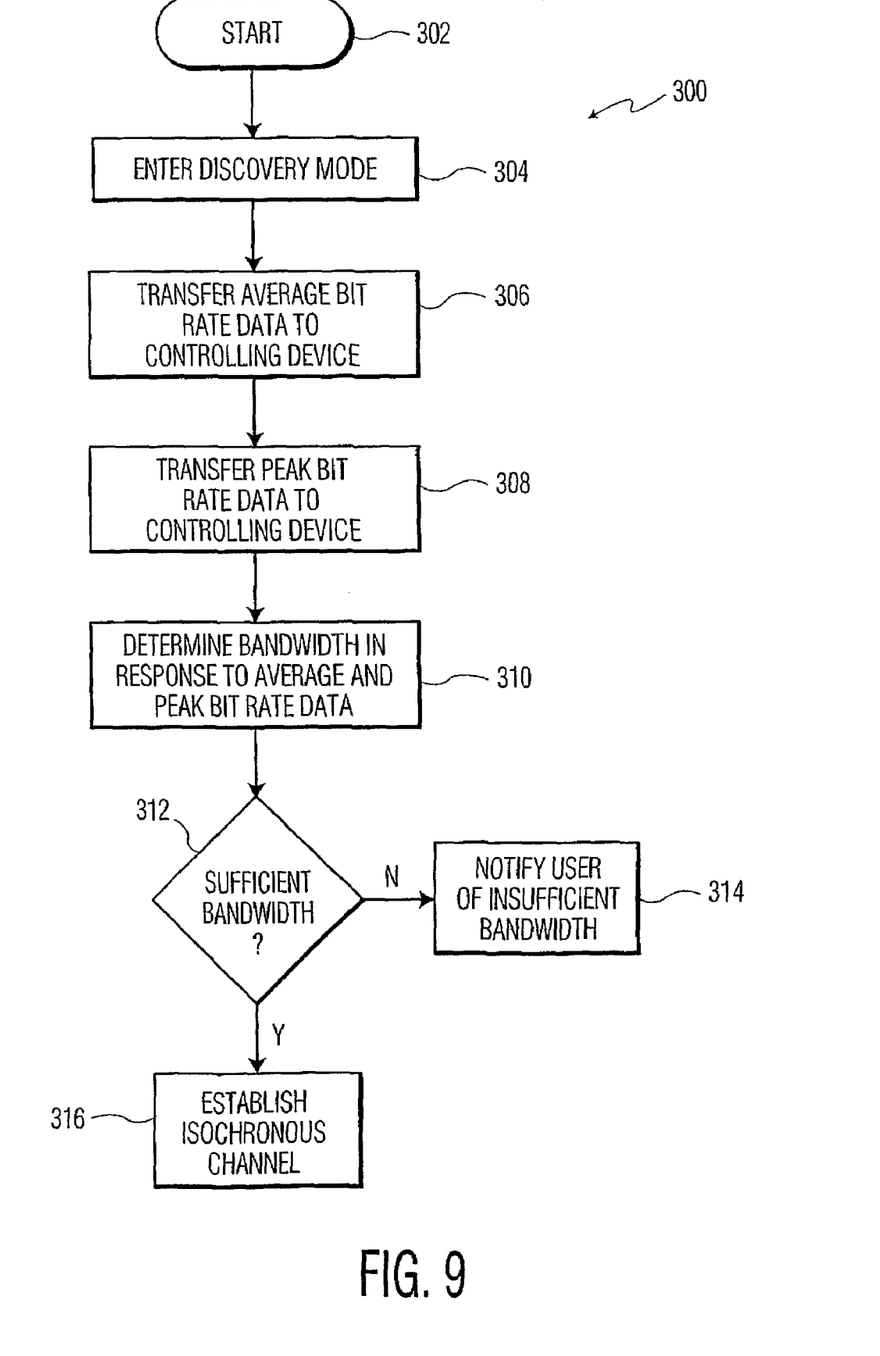
FIG. 9 shows the steps for establishing an isochronous channel having a bandwidth determined in response to identifying information from a peripheral device in accordance with the present invention.

In this case, one of the reserved bytes could specify the average bit rate of the stream that would be sent to the destination device after the destination device connects to the "digital_transport_stream_output_plug." The average bit rate may be determined over a period of time that is suitable for video application, for example, one frame, which generally corresponds to $\frac{1}{30}^{th}$ of a second. The other reserved byte could specify the peak bit rate sent from the destination device. In this manner, by reading the bit rates specified in the reserved, or otherwise added fields, the destination device is able to determine the bandwidth needs of the various source devices prior to setting up the isochronous channels, and therefore can efficiently allocate the bandwidth based on the needs of the source devices. The average and peak bit rates may be used alone or in combination to determine the suitable bandwidth. For example, the suitable bandwidth may be based on an intermediate bit rate that is determined by weighting the two bit rates. Furthermore, buffer space may be allocated at the receiver in view of the bandwidth to reduce unwanted effects, which buffer space may be dynamically allocated as necessary. A method for implementing the above is illustrated in FIG. 9.

In controlling various devices interconnected by a digital bus, it may be possible to control the various devices using differing GUI approaches, for example, it may be possible to use a bit-mapped OSD data approach or a web based approach. In the bit-mapped OSD approach, the source device transfers the bit map data that is used by the controlling device to generate the display, including the various selection icons. In the web based approach, an HTML browser is included in the controlling device, and the source devices, such as STBs or DVCRs, basically act as web servers from the controlling device point of view with respect to the GUI. OSD Web pages are requested from the source device by the controlling device. Upon receipt of the data, the controlling device renders the HTML page. The user can then navigate the web page using the controlling device's remote control. When the user makes a selection, the controlling device transmits a signal to the source device to request the file contained in the hyperlink. The source device may send a new HTML file when the device receives the file request or may perform some action based on the request for that file. For example, the displayed OSD may have a button for PLAY. When the user selects that button, the controlling device transmits a request for the filename in the hyperlink. The source device, such as a VCR, may be configured to equate the request for the PLAY file with a command to begin playback. Other user interface modes may utilize other suitable descriptive languages, including, but not limited to, AV/C panel sub-unit, or HAVi DDI controller.

There are several differences between EIA-775A, which uses the bit-mapped OSD method of control, and a web based control that makes the control paradigms difficult to mix. EIA-775A control uses the remote control unit of the device being controlled. The web based control may only use the remote control unit of the controlling device. For EIA-775A, the device being controlled is solely responsible for its state. For the web based control, there may be a state transition in the controlling device since JAVA Script is allowed in the HTML pages. One way to overcome these difficulties is to allow a user to choose their preferred control method for each device that appears on the source selection screen. For some of the devices, only EIA-775A control would be available. However, for other devices, there may be a choice.

In accordance with the present invention, the user is provided with a set up procedure that allows them to choose their preferred UI for each device in the selection screen. The set up procedure may comprise making selections on a series of set up screens for each source device connected to the display. In this regard, the user may want to interact with devices that are in the same room using EIA-775A using the remote controls associated with these devices. However, they may want to interact with a device in a different room using web based control. After preferences have been set, when the user chooses a device from the source selection screen, the controlling device enters the chosen control mode for that device. The present invention also allows the user to enter an override mode to override the programmed defaults when the user desires.

Alternatively, the controlling device may include a hierarchy of preferences for the protocol to be used. For instance, the controlling device may HAVi, and then fall back to AV/C panel, then AV/C sub-unit, then EIA-775 and so on, if the preferred protocol is not supported by the source device. However, the user could be given the choice to modify the priority of these protocols, perhaps globally. Additionally, as noted above, the user may be provided with a set up procedure that allows them to choose their preferred UI for each device.

In a system comprising multiple devices coupled via a digital bus, it may be desirable to set up a cluster having multiple streams from multiple sources to one or more display devices. For, example, it would be desirable to display multiple programs from different sources onto a single DTV. A common application of this capability is known as PIP (Picture in Picture). In the analog world, PIP is typically implemented by providing multiple inputs to the TV (in the case where the sources are external) or by providing multiple tuners in the TV (main and PIP). Most of the processing support for implementing these features rests in capabilities and features of the TV. This would also be true for a DTV. However, if the signal sources were external and connected to the DTV via a digital bus such as IEEE1394, there would need to be multiple streams from the external source(s) to the DTV. IEEE1394 supports the transport of multiple streams. However, EIA-775A only provides for the discovery of a single input plug and a single output plug. Therefore, it may be desirable to extend the discovery structures to include additional plugs in order to support MSD and PIP.

In this regard, the number of discoverable outputs may need to be limited or to have some meaning placed to them. Currently, there is only one output. So, it is clear what output the DTV should be connecting to when an external device is chosen as a signal source. However, if there are 15 outputs, the DTV must be provided with a means for determining which output with which to connect. Additionally, it may be important to provide a method for discovering multiple OSD plugs. If there are two outputs from a STB, one can be the primary channel and the other can be a secondary channel. But logically to the user, the two outputs appear to be two different signal sources, each possibly with its own configuration and control.

As noted above, there are two levels of discovery described in EIA-775A. To discover the highest level of information regarding interoperability, a controlling device reads the IEEE1212 Configuration ROM of all the other devices on the IEEE1394 network immediately after a bus reset. From this, the controlling device learns what other devices support AV/C and/or EIA-775A. If they support EIA-775A, then the vendor name, model name, and model number are also available in the configuration ROM. To discover more detailed information, the controlling device needs to access the AV/C Unit Info Blocks through the use of the "Open Descriptor" Command and the "Unit Info" Command. EIA-775A has defined two EIA-specific Info Blocks using the vendor specific feature (i.e., EIA-775 Plug Info and EIA-775 DTV Info). The format for the EIA-775 Plug Info Block is shown below in FIGS. 5 and 6.

Figure 6:
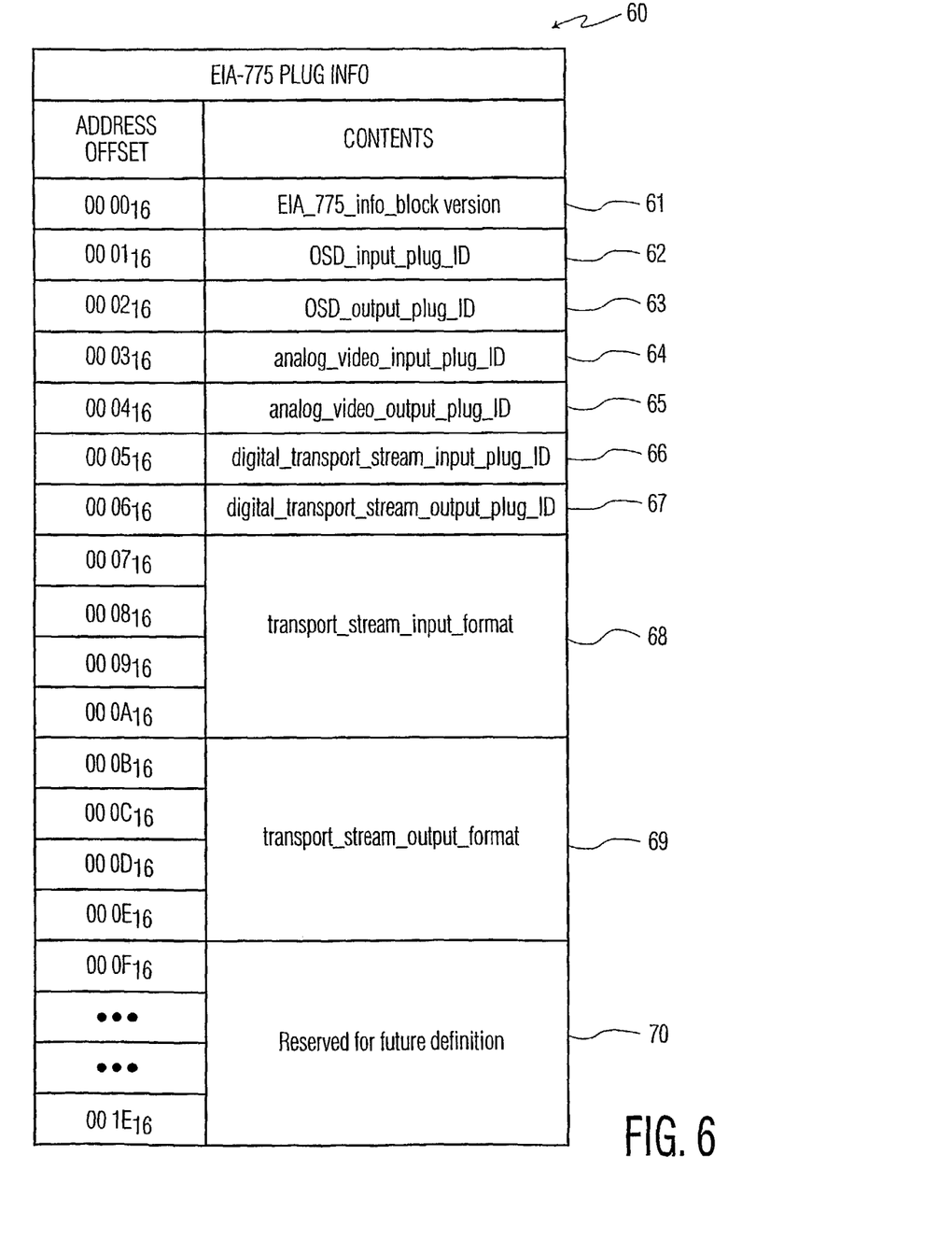
FIG. 6 shows a table illustrating the elements of the EIA-775 plug info block according to the present invention.

FIG. 6 includes the specification of input and output plugs. FIG. 6 also includes fields that specify the transport stream formats. These two tables may also be modified in a manner known by those skilled in the art to add additional plug IDs and at the same time maintain backward compatibility with the current version of EIA-775A. For example, the field designated as "Reserved for future definitions" in Table 2 may be used for such purposes. The information in offset $0001_{16}$ through offset $000E_{16}$ could be duplicated in offsets $000F_{16}$ through $001C_{16}$. The new information would have the additional qualifier as "secondary" (e.g., Secondary_digital_transport_stream_output_plug_ID) to distinguish it from the primary input/output plugs that have already been included. The EIA_775_info_block version could be incremented to signify the new format. As such, a method for providing discovery of additional plugs for allowing multiple streams that may be used for multiple displays has been described.

In a system comprising various devices interconnected via a digital bus according to the present invention, the user may choose a particular source device using the controlling device. One way to select the device is for the display associated with the controlling device to provide a source selection screen. This screen may be built based on information that the controlling device reads from each device's discovery ROM (and AV/C unit descriptors) during the discovery process. This source selection screen can be displayed to the user and the user can navigate the screen using the remote control keys of the controlling device. Once a source device is chosen, the controlling device sets up an isochronous channel.

One disadvantage of this method is that the user may be required to traverse several menus to choose a source. One way of reducing the number of key pushes and menus would be for the controlling device to provide a "Source Selection Screen" button directly on the remote control of the controlling device. In this case, the user would only need to press one button to call up the source selection screen. The user would then navigate that screen using the controlling device's remote control.

Another method is to provide a source selection button such that when the button is pressed, the controlling device scrolls through the list of possible source devices. The current selection can be displayed on the display for a limited amount of time. When the button is pressed again, the next selection is displayed. If the user stops there, then that device remains selected until a new source selection process begins.

Figure 7:
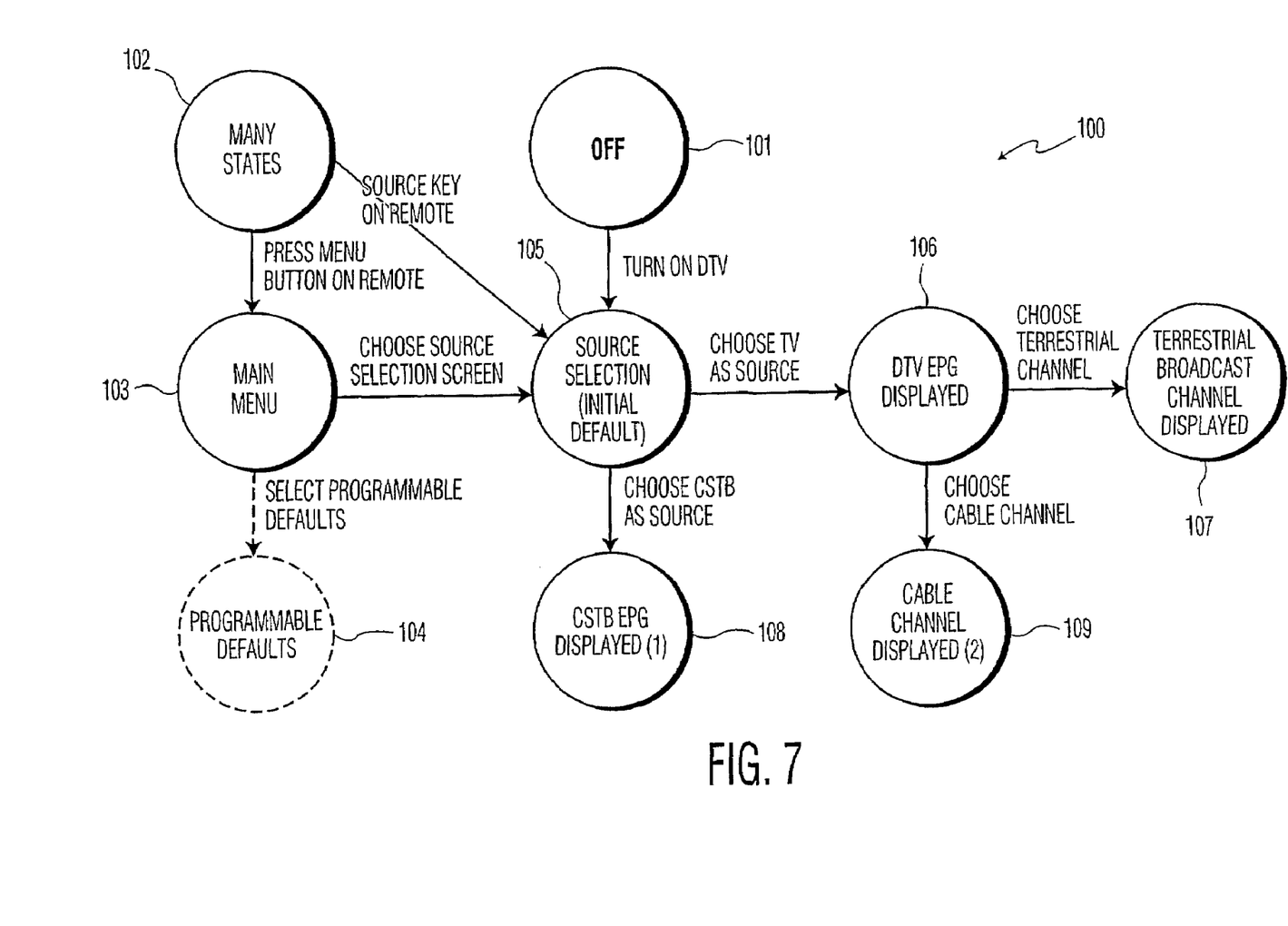
FIG. 7 shows a state diagram for implementing device control selection according to the present invention.

Another method is to provide specific device buttons on the remote control unit of the controlling device. For example, typical devices may include DVD players, Cable STB, DSS STB, DVCR, etc. Buttons can be provided on the DTVs remote control for each of these devices. Similar buttons are already provided on many of today's remote controls, wherein when the button is pressed, it changes which device the RC commands are addressed to. Such buttons would still perform this function, but at the same time would send a command to the controlling device directing the device to choose that source device. The state diagram illustrated in FIG. 7 shows how this feature may be implemented in a controlling device, in particular a DTV.

While the invention has been described in detail with respect to numerous embodiments thereof, it will be apparent that upon a reading and understanding of the foregoing, numerous alterations to the described embodiment will occur to those skilled in the art and it is intended to include such alterations within the scope of the appended claims.

The invention claimed is:

1. A digital television apparatus, comprising:
   a display;
   a processor, coupled to the display, for providing OSD output signals to the display in response to user commands transmitted from a remote control unit associated with the digital television apparatus;
   means, coupled to the processor, for communicating with a peripheral device interconnected by a digital bus, and receiving from the peripheral device OSD signals formatted in accordance with one of a first and a second user interface mode for generating a user interface display for controlling operation of the peripheral device, the processor providing OSD output signals according to a respective processing mode associated with received OSD signals;
   the processor generating OSD signals for providing a user interface mode selection display in response to a predetermined user command, the user interface mode selection display allowing the user to select one of the first user interface mode and the second user interface mode as a default user interface mode, the processor transmitting user selection of the default user interface mode to the peripheral device to thereby request that subsequent OSD signals from the peripheral devices be formatted in accordance with the default user interface mode.

2. The apparatus according to claim 1, wherein the first user interface utilizes bit mapped OSDs.

3. The apparatus according to claim 1, wherein the second user interface mode utilizes a descriptive language.

4. The apparatus according to claim 3, wherein the descriptive language comprises one of HTML, AVC panel sub-unit, and HAVi DDI controller.

5. In a digital television apparatus, a method for generating OSD signals in response to a user command comprising the steps of:
   receiving, from a peripheral device digitally coupled to the digital television apparatus, OSD signals formatted In accordance with one of first and second user interface modes for generating a user interface display for controlling operation of the peripheral device;
   providing OSD output signals to a display according to a respective processing mode associated with the received OSD signals;
   providing a user interface selection screen to a user, the selection screen displaying the types of user interface modes available, including the first and second user interface modes, and allowing a user to select one of the first and second user interface modes as a default interface mode;
   accepting the default user interface mode selected by the user; and
   transmitting user selection of the default user interface mode to the peripheral device to thereby request that subsequent OSD signals form the peripheral device be formatted in accordance with the selected default user interface mode.

6. The method according to claim 5, wherein the first user interface utilizes bit mapped OSDs in accordance with EIA-775A.

7. The method according to claim 5, wherein the second user interface mode utilizes a descriptive language for allowing the user to control the peripheral device.

8. The method according to claim 7, wherein the descriptive language comprises one of HTML, AVC panel sub-unit, and HAVi DDI controller.

9. In a digital video processing apparatus, a method for generating OSD signals in response to a user command comprising the steps of:
   receiving, from a peripheral device digitally coupled to the digital video processing apparatus, OSD signals formatted in accordance with one of first and second user interface modes for generating a user interface display for controlling operation of the peripheral device;
   providing OSD output signals to a display according to a respective processing mode associated with the received OSD signals;
   providing a user interface selection screen to a user, the selection screen displaying the types of user interface modes available, including the first and second user interface modes, and a default interface mode corresponding to one of the first and second user interface modes;
   accepting selection of the default interface mode by the user; and
   transmitting user selection of the default user interface mode to the peripheral device to thereby request that subsequent OSD signals form the peripheral device be formatted in accordance with the selected default user interface mode.

10. The method of claim 9, wherein the default interface mode corresponds to a user interface mode selected based on a predetermined hierarchy of interface modes.

11. The method of claim 10, wherein the predetermined hierarchy of interface modes comprises at least bit mapped based OSDs and descriptive language based OSDs.

12. The method of claim 11, wherein the descriptive language comprises one of HTML, AVC panel sub-unit, and HAVi DDI controller.

13. The method of claim 11, further comprising the step of providing to the user an option of modify the hierarchy of interface modes.

14. The method of claim 13, wherein the option is provided upon user selection of the peripheral device from a device selection menu.

15. A digital video processing apparatus, comprising:
    a processor for providing OSD signals in response to user commands transmitted from a remote control unit associated with the digital video processing apparatus;
    communications interface, coupled to the processor, for communicating with a peripheral device digitally interconnected to the digital video processing apparatus, and transmitting to the peripheral device OSD signals formatted in accordance with one of first and second user interface modes for generating on the peripheral device a user interface display for controlling operation of the apparatus, wherein the communications interface is adapted to receive from the peripheral device a message indicating user selection of a default user interface mode, the processor generating subsequent OSD signals in accordance with the default user interface mode in response to the message.

16. The method of claim 15, wherein the default interface mode corresponds to a user interface mode selected based on a predetermined hierarchy of interface modes.

17. The apparatus of claim 16, wherein the predetermined hierarchy of interface modes comprises at least bit mapped based OSDs and descriptive language based OSDs.

18. The apparatus of claim 17, wherein the descriptive language comprises one of HTML, AVC panel sub-unit, and HAVi DDI controller.

19. In a digital video processing apparatus, a method for generating OSD signals in response to a user command comprising the steps of:

generating OSD signals in response to user commands transmitted from a remote control unit associated with the digital video processing apparatus, the OSD signals formatted in accordance with one of first and second user interface modes for generating a user interface display for controlling operation of the peripheral device;

transmitting the OSD signals to a peripheral device digitally coupled to the digital video processing apparatus;

receiving from the peripheral device a message indicating user selection of a default user interface made corresponding to one of the first and second user interface modes;

generating subsequent OSD messages in accordance with the default user interface mode in response to the message indicating user selection.

20. The method of claim 19, wherein the default interface mode corresponds to a user interface mode selected based on a predetermined hierarchy of interface modes.

21. The method of claim 20, wherein the predetermined hierarchy of interface modes comprises at least bit mapped based OSDs and descriptive language based OSDs.

22. The method of claim 21, wherein the descriptive language comprises one of HTML, AVC panel sub-unit, and HAVi DDI controller.

\* \* \* \* \*

UNITED STATES PATENT AND TRADEMARK OFFICE
CERTIFICATE OF CORRECTION

PATENT NO. : 7,659,940 B2  Page 1 of 1
APPLICATION NO. : 10/275199
DATED : February 9, 2010
INVENTOR(S) : Stahl et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2166 days.

Signed and Sealed this

Thirtieth Day of November, 2010

David J. Kappos
*Director of the United States Patent and Trademark Office*